United States Patent
Kanterakis et al.

(12) 
(10) Patent No.: US 6,389,056 B1
(45) Date of Patent: May 14, 2002

(54) PRE-DATA POWER CONTROL COMMON PACKET CHANNEL

(75) Inventors: Emmanuel Kanterakis, North Brunswick, NJ (US); Kourosh Parsa, Riverside, CT (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 0 days.

(21) Appl. No.: 09/275,010

(22) Filed: Mar. 24, 1999

Related U.S. Application Data

(63) Continuation-in-part of application No. 09/273,508, filed on Mar. 22, 1999.

(51) Int. Cl.[7] .................................................. H04K 1/00
(52) U.S. Cl. ......................... 375/130; 375/141; 370/342
(58) Field of Search ................................ 375/130, 141, 375/146, 147, 356; 370/342, 347, 445; 455/422, 522

(56) References Cited

U.S. PATENT DOCUMENTS

| | | | | |
|---|---|---|---|---|
| 5,103,459 A | * | 4/1992 | Gilhousen et al. | 375/130 |
| 5,384,777 A | | 1/1995 | Ahmadi et al. | 370/337 |
| 5,461,639 A | | 10/1995 | Wheatley, III et al. | 370/342 |
| 5,621,723 A | * | 4/1997 | Walton, Jr. et al. | 375/130 |
| 5,673,259 A | | 9/1997 | Quick, Jr. | 370/342 |
| 5,802,465 A | | 9/1998 | Hamalainen et al. | 455/403 |
| 5,825,835 A | | 10/1998 | Kingston et al. | 370/367 |
| 5,850,602 A | | 12/1998 | Tisdale et al. | 455/430 |
| 5,875,182 A | | 2/1999 | Hatzipapafotiou | 370/321 |
| 5,893,036 A | | 4/1999 | Trandai et al. | 370/522 |
| 5,894,472 A | | 4/1999 | de Seze | 370/337 |
| 5,933,777 A | | 8/1999 | Rahman | 455/450 |
| 5,943,327 A | | 8/1999 | Mademann | 455/450 |
| 5,953,369 A | | 9/1999 | Suzuki | 375/148 |
| 5,982,763 A | | 11/1999 | Sato | 370/342 |
| 5,991,308 A | | 11/1999 | Fuhrmann et al. | 370/395.53 |
| 6,009,089 A | | 12/1999 | Huang et al. | 370/342 |
| 6,026,081 A | | 2/2000 | Hamabe | 370/342 |
| 6,028,851 A | * | 2/2000 | Persson et al. | 370/335 |
| 6,031,832 A | | 2/2000 | Turina | 370/348 |
| 6,038,223 A | | 3/2000 | Hansson et al. | 370/329 |
| 6,038,250 A | | 3/2000 | Shou et al. | 375/143 |
| 6,011,788 A | | 4/2000 | Hurst et al. | 370/335 |
| 6,115,390 A | * | 9/2000 | Chuah | 370/443 |
| 6,163,553 A | * | 12/2000 | Esmailzadeh et al. | 370/342 |

* cited by examiner

*Primary Examiner*—Tesfaldet Bocure
(74) *Attorney, Agent, or Firm*—McDermott, Will & Emery

(57) ABSTRACT

An improvement to a code-division-multiple-access (CDMA) system employing spread-spectrum modulation, with the CDMA system having a base station (BS) and a plurality of remote stations. The base station has a BS-spread-spectrum transmitter and a BS-spread-spectrum receiver. A remote station has an RS-spread-spectrum transmitter and an RS-spread-spectrum receiver. The BS transmitter transmits a broadcast common-synchronization channel, which includes a frame-timing signal. The broadcast common-synchronization channel has a common chip-sequence signal, which is common to the plurality of remote stations. In response to the RS-spread-spectrum receiver receiving the broadcast common-synchronization channel, and determining frame timing from the frame-timing signal, an RS-spread-spectrum transmitter transmits an access burst signal, which includes a plurality of RS-preamble signals, RS-power-control signals, and RS-pilot signals, respectively, transmitted in time, at increasing power levels. The BS-spread-spectrum transmitter, responsive to the BS-spread-spectrum receiver receiving the access-burst signal, and detecting an RS-preamble signal, transmits an acknowledgment signal. In response to the first RS-spread-spectrum receiver receiving the acknowledgment signal, the first RS-spread-spectrum transmitter transmits a spread-spectrum signal having data.

26 Claims, 12 Drawing Sheets

(A) [ $g_{k,0}A$ | $g_{k,1}A$ | $g_{k,2}A$ | - - - | $g_{k,N-1}A$ ]

(B) [ $g_{k,0}A_{k,I0}$ | $g_{k,1}A_{k,I1}$ | $g_{k,2}A_{k,I2}$ | - - - | $g_{k,N-1}A_{k,I(N-1)}$ ]

$$A_{k,Ij} \in [A_0, A_1, A_2, \ldots, A_{N-1}]$$
$$A_{k1,Ij} \neq A_{k2,Ij}$$

FIG 8

PRE-DATA POWER CONTROL COMMON PACKET CHANNEL

CROSS REFERENCE TO RELATED APPLICATION

This application is a continuation in part of U.S. patent application Ser. No. 09/273,508, filed Mar. 22, 1999, entitled COMMON PACKET CHANNEL.

BACKGROUND OF THE INVENTION

This invention relates TO spread-spectrum communications, and more particularly to code-division-multiple-access (CDMA) cellular, packet-switched systems.

DESCRIPTION OF THE RELEVANT ART

Presently proposed for a standard is a random-access burst structure which has a preamble followed by a data portion. The preamble has 16 symbols, the preamble sequence, spread by an orthogonal Gold code. A mobile station acquires chip and frame synchronization, but no consideration is given to closed-loop power control or collision detection.

SUMMARY OF THE INVENTION

A general object of the invention is an efficient method for packet data transfer on CDMA systems.

Another object of the invention is high data throughput and low delay, and efficient power control.

According to the present invention, as embodied and broadly described herein, an improvement to a code-division-multiple-access (CDMA) system employing spread-spectrum modulation, is provided. The CDMA system has a base station (BS) and a plurality of remote stations. The base station has BS-spread-spectrum transmitter and a BS-spread-spectrum receiver. Each of the plurality of remote stations has an RS-spread-spectrum transmitter, a broadcast common-synchronization channel. The broadcast common-synchronization channel has a common chip-sequence signal common to the plurality of remote stations. Further, the broadcast common-synchronization channel has a frame-timing signal.

At a first RS-spread-spectrum receiver, located at a first remote station, the method includes the step of receiving the broadcast common-synchronization channel. From the received broadcast common-synchronization channel, the steps include determining frame timing at the first RS-spread-spectrum receiver from the frame-timing signal.

At a first RS-spread-spectrum transmitter, located at the first remote station, the steps include transmitting an access-burst signal. The access-burst signal has a plurality of segments. A segment is an interval in time of the access-burst signal. Each segment has a preamble followed by a pilot signal. The plurality of segments preferably also has a plurality of power levels, respectively. Preferably, the plurality of power levels increase sequentially, with each segment. More particularly, the access-burst signal has a plurality of RS-preamble signals, RS-power-control signals, and RS-pilot signals, respectively, transmitted in time, at increasing power levels.

At the BS spread-spectrum receiver the steps include receiving the access-burst signal at a detected-power level. In response to receiving the access-burst signal, from the BS-spread-spectrum transmitter, the steps include transmitting to the first RS-spread-spectrum receiver an acknowledgment signal.

At the first RS-spread-spectrum receiver the steps include receiving the acknowledgment signal. In response to receiving the acknowledgment signal, the steps include transmitting from the first RS-spread-spectrum transmitter, to said BS-spread-spectrum receiver, a spread-spectrum signal having data. The spread-spectrum signal having data may be concatenated with the portion of the access-burst signal having a plurality of RS-preamble signals, RS-power-control signals, and RS-pilot signals, respectively.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 8 shows the structure of the preamble;

DETAILED DESCRIPTION OF THE PREFERRED EMBODIMENTS

Figure 1:
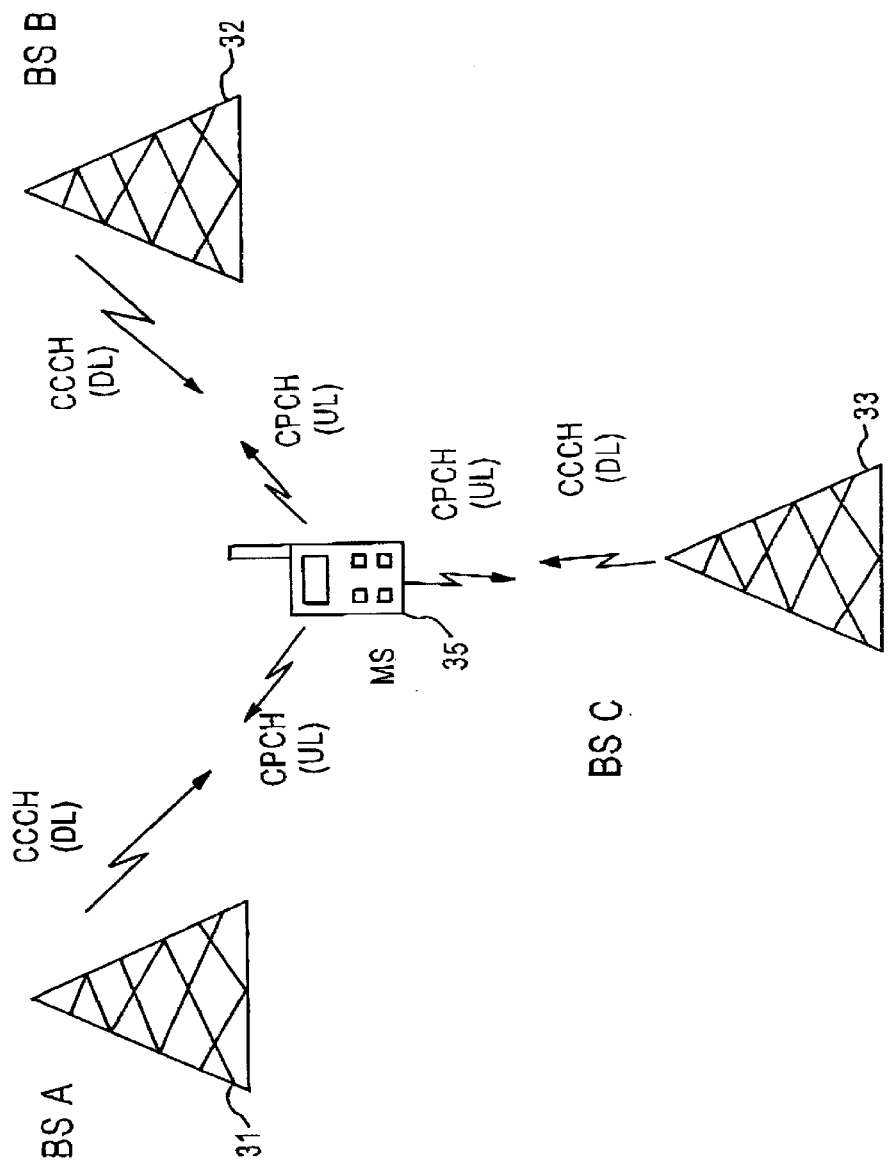
FIG. 1 is a common packet channel system block diagram with a common control downlink channel.

Reference now is made in detail to the present preferred embodiments of the invention, examples of which are illustrated in the accompanying drawings, wherein like reference numerals indicate like elements throughout the several views.

The common-packet channel is a new and novel uplink transport channel for transmitting variable size packets from a mobile station to a base station within listening range, without the need to obtain a two way link with any one or set of base stations. The channel resource allocation is contention based; that is, a number of mobile stations could at any time content for the same resources, as found in an ALOHA system.

In the exemplary arrangement shown in FIG. 1, common-packet channel provides an improvement to a code-division-multiple-access (CDMA) system employing spread-spectrum modulation. The CDMA system has a plurality of base stations (BS) 31, 32, 33 and a plurality of remote stations (RS). Each remote station 35 has an RS-spread-spectrum transmitter and an RS-spread-spectrum receiver. An uplink is from the remote station 35 to a base station 31. The uplink has the common-packet channel (CPCH). A downlink is from a base station 31 to the remote station 35, and is denoted a common-control channel (CCCH). The common-control channel has common signaling used by the plurality of remote stations.

Figure 2:
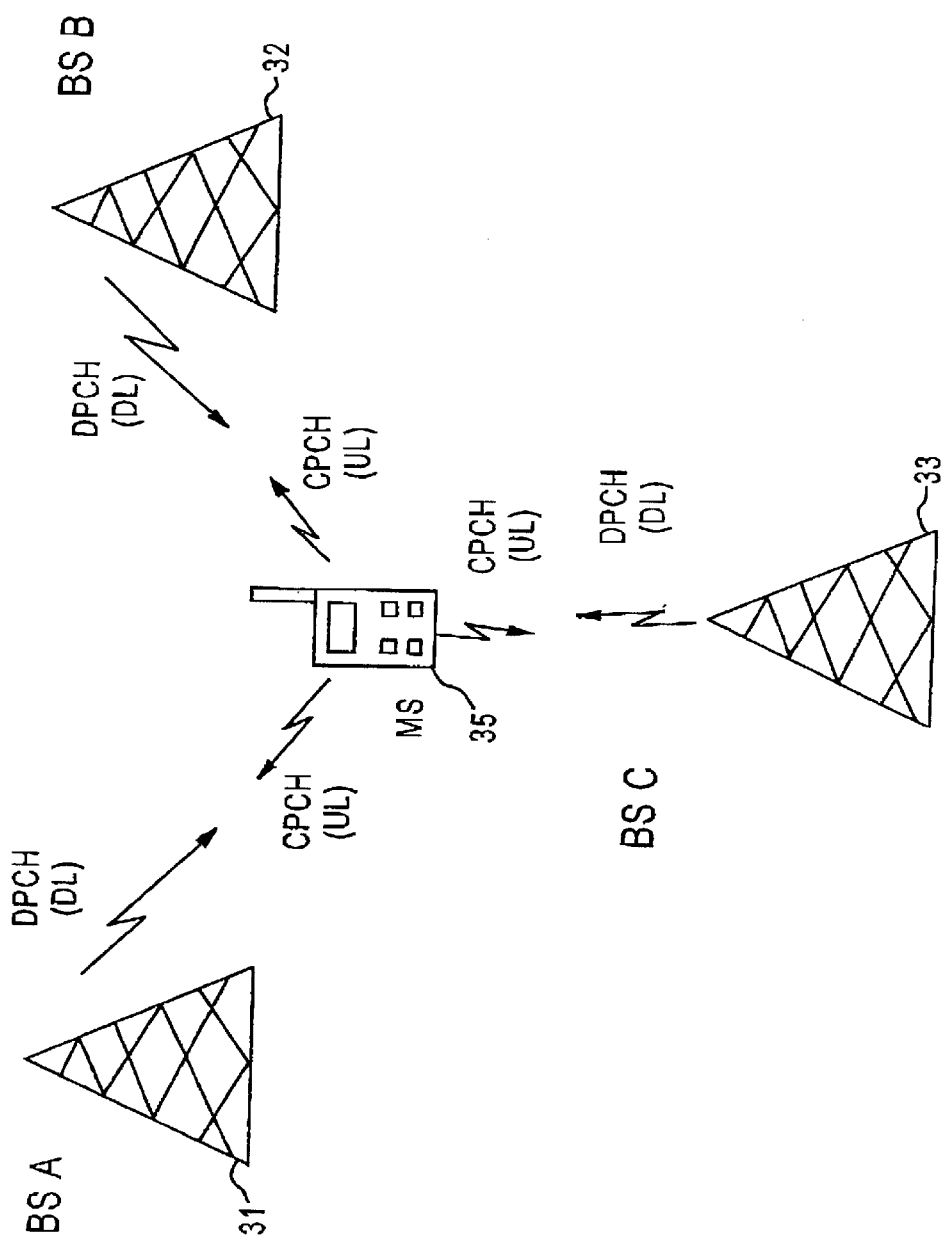
FIG. 2 is common packet channel system block diagram with a dedicated downlink channel.

An alternative to the common-control channel, but still using the common-packet channel, is the downlink dedicated physical channel (DPCH), shown in FIG. 2. The dedicated downlink channel, has signaling that is used for controlling a single remote station.

Figure 3:
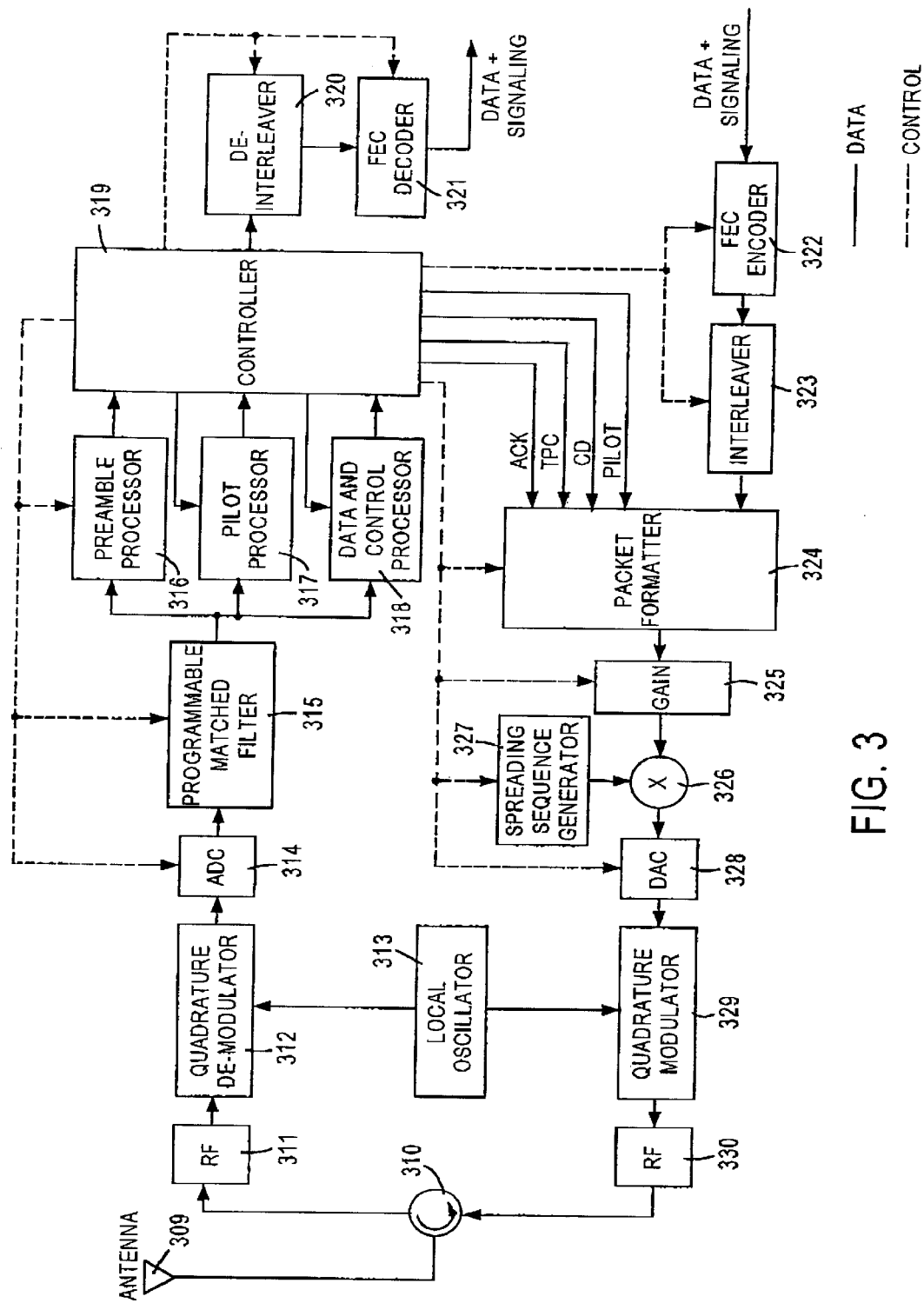
FIG. 3 is a block diagram of a base station receiver and transmitter for common packet channel.

As illustratively shown in FIG. 3, a BS spread-spectrum transmitter and a BS spread-spectrum receiver is shown. The BS spread-spectrum transmitter and the BS spread-spectrum receiver are located at the base station 31. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321.

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, programmable-matched filter 315, preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by receiver RF section 311. The local oscillator 313 generates a local signal which quadrature demodulator 312 uses to demodulator in-phase and quadrature phase components of the received spread-spectrum signal. The analog-to-digital converter 314 converts the in-phase component and the quadrature-phase component to a digital signal. These functions are well known in the art, and variations to this block diagram can accomplish the same function.

The programmable-matched filter 315 despreads the received spread-spectrum signal. A correlator, as an alternative, may be used as an equivalent means for despeading the received spread-spectrum signal.

The preamble processor 316 detects the preamble portion of the received spread-spectrum signal. The pilot processor detects and synchronizes to the pilot portion of the received spread-spectrum signal. The data and control processor detects and processes the data portion of the received spread-spectrum signal. Detected data passes through the controller 319 to the de-interleaver 320 and FEC decoder 321. Data and signaling are outputted from the FEC decoder 321.

In the BS transmitter, data are FEC encoded by FEC encoder 322, and interleaved by interleaver 323. The packet formatter formats data, signaling, acknowledgment signal, collision detection signal, pilot signal and transmitting power control (TPC) signal into a packet. The packet is outputted from packet formatter, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The packet is translated to a carrier frequency, filtered and amplified by transmitter RF section 330, and then passes through circulator 310 and is radiated by antenna 309.

Figure 4:
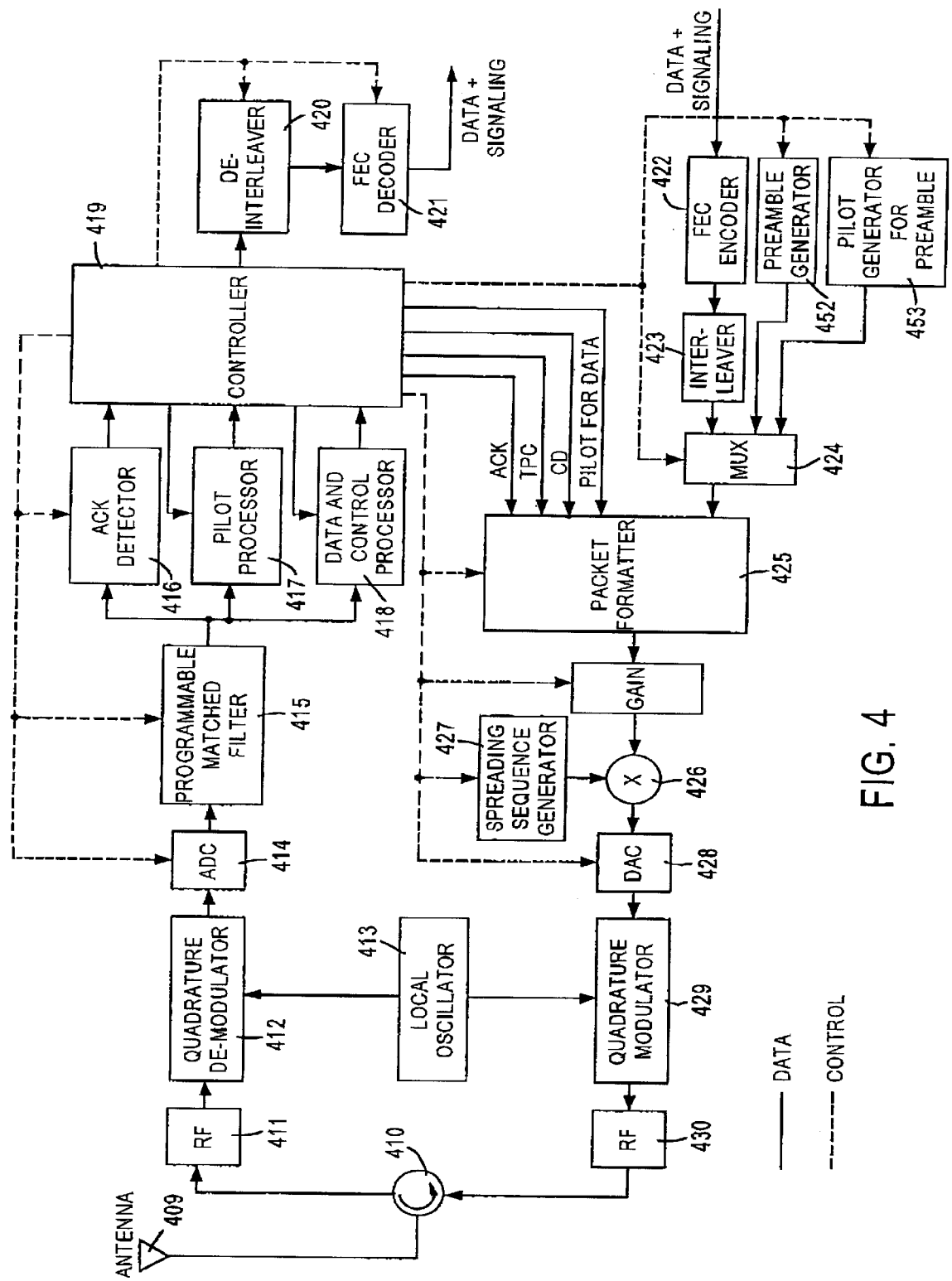
FIG. 4 is a block diagram of a remote station receiver and transmitter for common packet channel.

In the illustrative embodiment shown in FIG. 4, a RS spread-spectrum transmitter and a RS spread-spectrum receiver are shown. The RS spread-spectrum transmitter and the RS spread-spectrum receiver are located at the mobile station 35, shown in FIG. 1. The RS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421.

The RS spread-spectrum transmitter includes a forward-error-correction (FEC) encoder 422 coupled to an interleaver 423. A packet formatter 424 is coupled through a multiplexer 451 to the interleaver 423 and to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is to the local oscillator 413 and a transmitter RF section 430. The transmitter RF section 430 is coupled to the circulator 410.

The controller 419 has control links coupled to the analog-to-digital converter 414, programmable-matched filter 415, acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by receiver RF section 411. The local oscillator 413 generates a local signal which quadrature demodulator 412 uses to demodulate in-phase and quadrature phase components of the received spread-spectrum signal. The analog-to-digital converter 414 converts the in-phase component and the quadrature-phase component to a digital signal. These functions are well known in the art, and variations to this block diagram can accomplish the same function.

The programmable-matched filter 415 despreads the received spread-spectrum signal. A correlator, as an alternative, may be used as an equivalent means for despreading the received spread-spectrum signal.

The acknowledgment detector 416 detects the an acknowledgment in the received spread-spectrum signal. The pilot processor detects and synchronizes to the pilot portion of the received spread-spectrum signal. The data and control processor detects and processes the data portion of the received spread-spectrum signal. Detected data passes through the controller 419 to the de-interleaver 420 and FEC decoder 421. Data and signaling are outputted from the FEC decoder 421.

In the RS transmitter, data are FEC encoded by FEC encoder 422, and interleaved by interleaver 423. The preamble generator 452 generates a preamble and the pilot generator 453 generates a pilot for the preamble. The multiplexer 451 multiplexes the data, preamble and pilot, and the packet formatter 424 formats the preamble, pilot and data into a common-packet channel packet. Further, the packet formatter formats data, signaling, acknowledgment signal, collision detection signal, pilot signal and TPC signal into a packet. The packet is outputted from packet formatter, and the packet level is amplified or attenuated by variable gain device 425. The packet is spread-spectrum processed by product device 426, with s spreading chip sequence from spreading-sequence generator 427. The packet is converted to an analog signal by digital-to-analog converter 428, and in-phase and quadrature-phase components are generated by quadrature modulator 429 using a signal from local oscillator 413.

Figure 5:
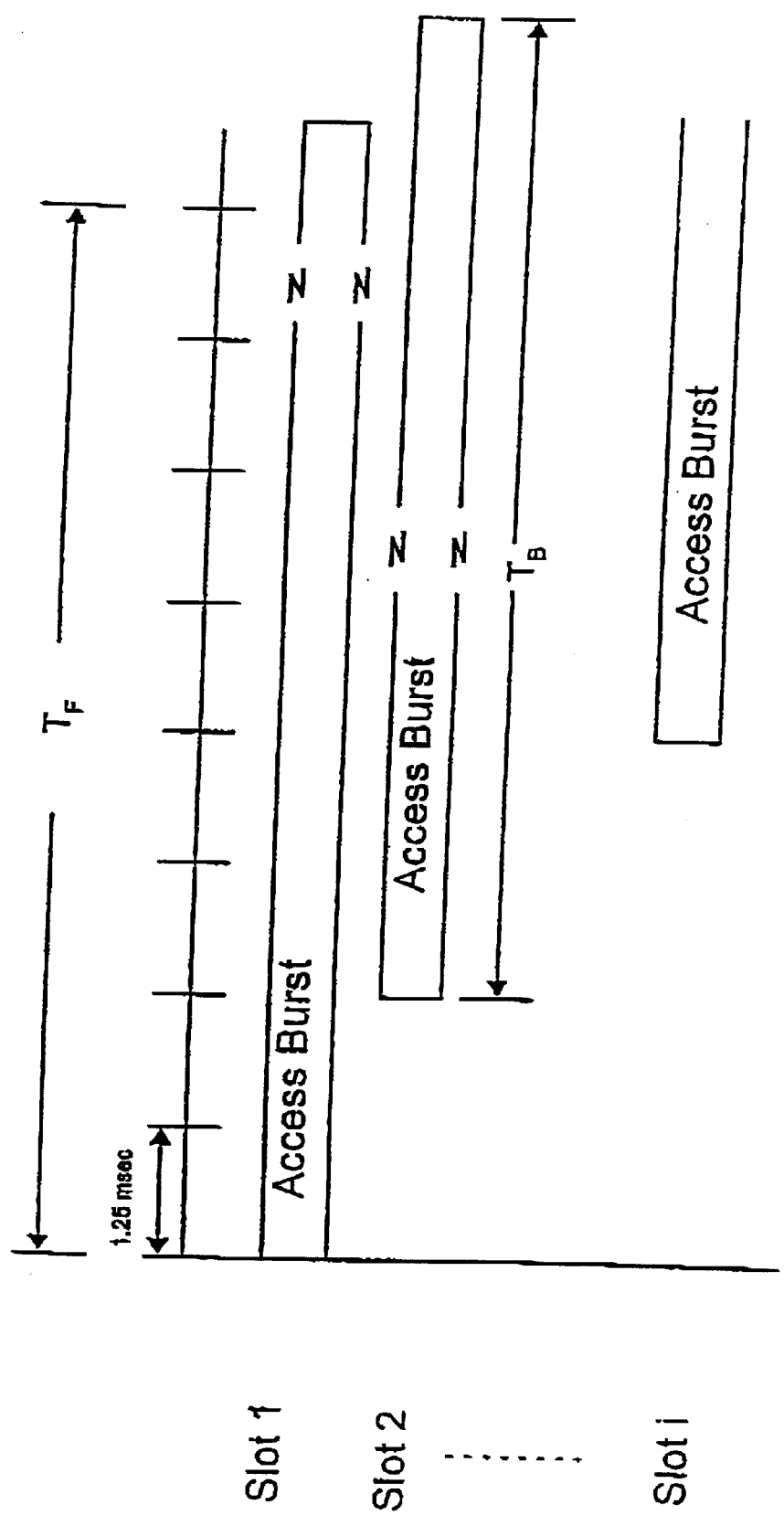
FIG. 5 is a timing diagram for access burst transmission.

Referring to FIG. 5, the base station transmits a common-synchronization channel, which has a frame time duration $T_F$. The common-synchronization channel has a common chip-sequence signal, which is common to the plurality of remote stations communicating with the particular base station. In a particular embodiment, the time $T_F$ of one frame is ten milliseconds. Within one frame, there are eight access slots. Each access slot lasts 1.25 milliseconds. Timing for the access slots is the frame timing, and the portion of the common-synchronization channel with the frame timing is denoted the frame-timing signal. The frame-timing signal is the timing a remote station uses in selecting an access slot in which to transmit an access-burst signal.

A first remote station attempting to access the base station, has a first RS-spread-spectrum receiver for receiving the common synchronization channel, broadcast from the base station. The first RS-spread-spectrum receiver determines frame timing from the frame-timing signal.

A first RS-spread-spectrum transmitter, located at the first remote station, transmits an access-burst signal. An access burst signal, as shown in FIG. 5, starts at the beginning of an access slot, as defined by the frame timing portion of the common-synchronization channel.

Figure 6:
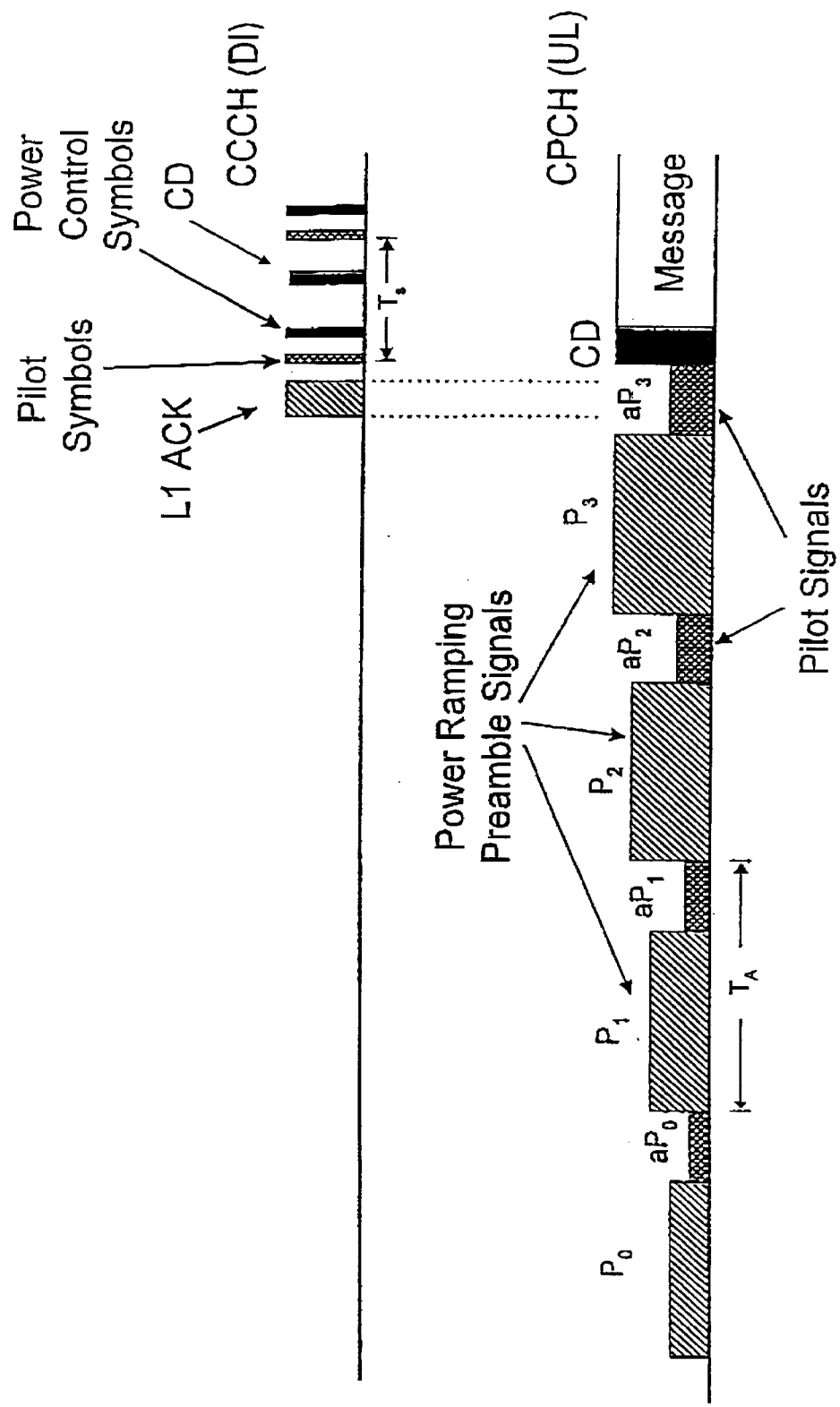
FIG. 6 illustrates common packet channel access burst of FIG. 5 using a common control downlink channel.
Figure 7:
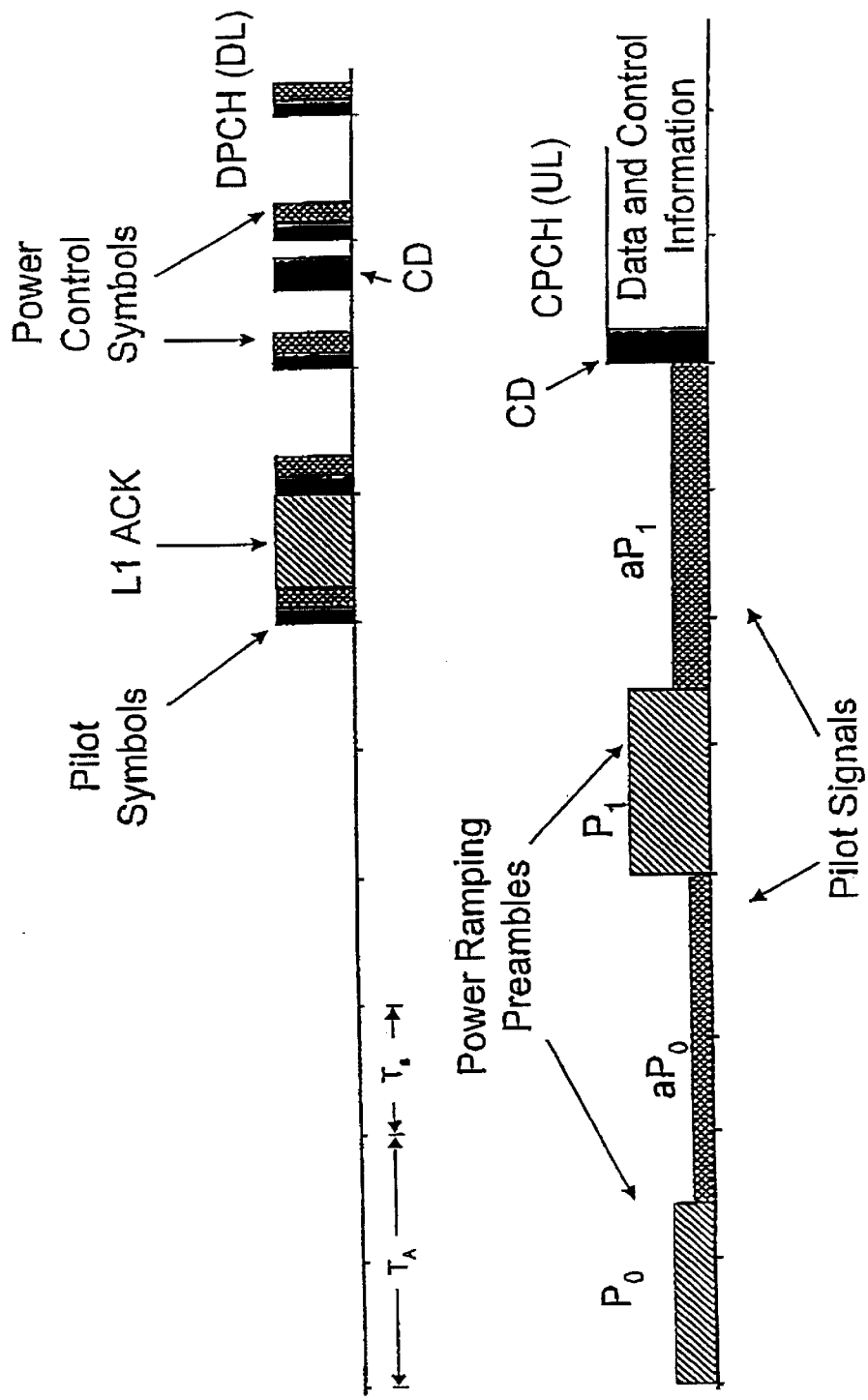
FIG. 7 illustrates common packet channel access of FIG. 5 using a dedicated downlink channel

FIG. 6 illustratively shows the common-packet channel ICES access burst format, for each access-burst signal. Each access-burst signal has a plurality of segments. Each segment has a preamble followed by a pilot signal. The plurality of segments has a plurality of power levels, respectively. More particularly, the power level of each segment increases with each subsequent segment. Thus, a first segment has a first preamble and pilot, at a first power level $P_0$. A second segment has a second preamble and a second pilot, at a second power level $P_1$. The third segment has a third preamble and a third pilot at a third power level $P_2$. The first preamble, the second preamble, the third preamble, and subsequent preambles, may be identical or different. The power level of the pilot preferably is less than the power level of the preamble. A preamble is for synchronization, and a corresponding pilot, which follows a preamble, is to keep the BS spread-spectrum receiver receiving the spread-spectrum signal from the remote station, once a preamble is detected.

A subsequent increase or decrease of power levels is basically a closed loop power control system. Once a BS spread-spectrum receiver detects a preamble from the remote station, the BS spread-spectrum transmitter sends an acknowledgment (ACK) signal.

Figure 9:
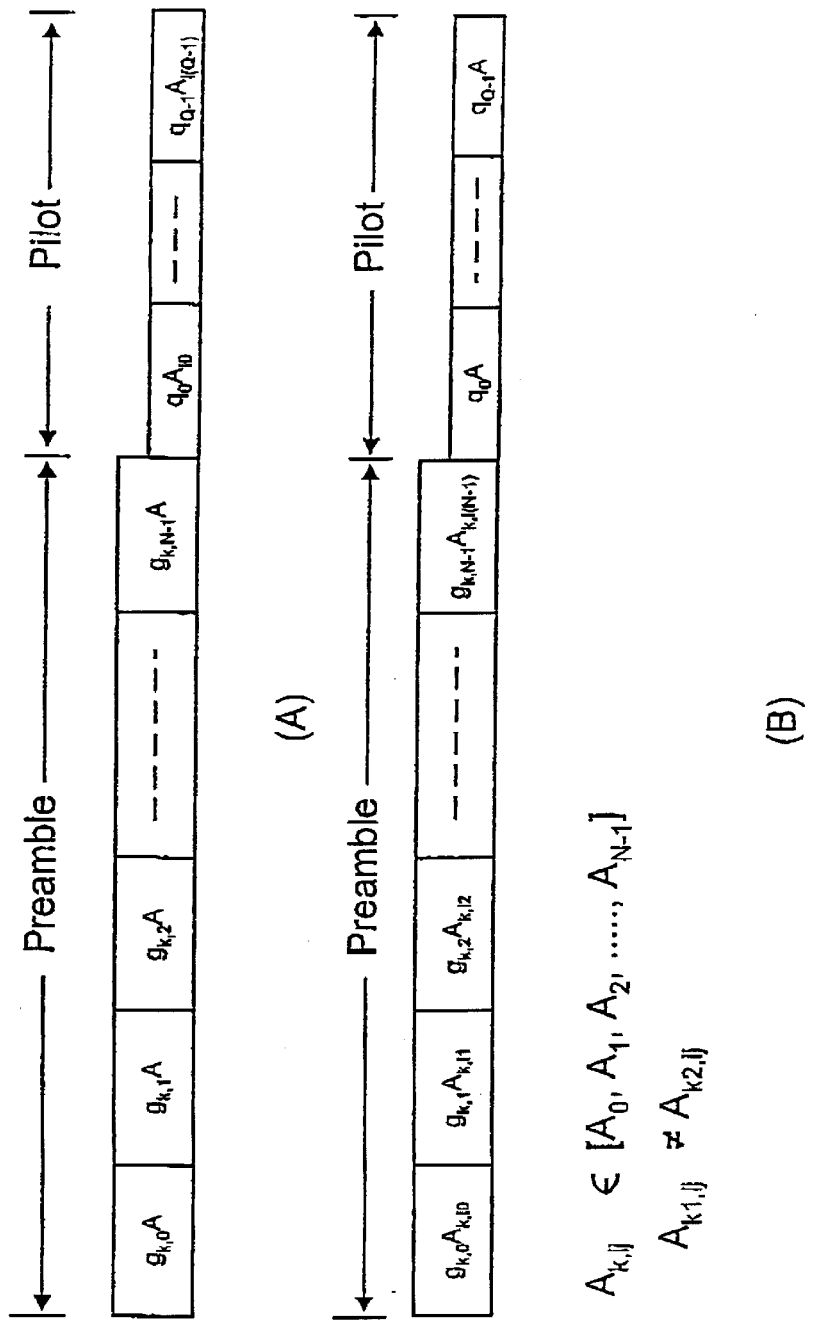
FIG. 9 illustrates preamble and pilot formats.

Referring to FIG. 4, the preamble is generated by preamble generator 452 and the pilot is generated by pilot generator 453. A preamble format is shown in FIG. 8. The preamble format with a pilot is shown in FIG. 9. The multiplexer 451, with timing from the controller 419, selects the preamble then a corresponding pilot, for packet formatter 424. A series of preambles and pilots may be generated and made as part of the packet by packet formatter 424. The preambles and pilots can have their power level adjusted either in the preamble generator 452 and pilot generator 453, or by the variable gain device 425.

The BS spread-spectrum receiver receives the access-burst signal at a detected-power level. More particularly, the access-burst signal has the plurality of preambles at a plurality of power levels, respectively. When a preamble with sufficient power level is detected at the BS spread-spectrum receiver, then an acknowledgment (ACK) signal is transmitted from the BS spread-spectrum transmitter. The ACK signal is shown in FIG. 6, in response to the fourth preamble having sufficient power for detection by the BS spread-spectrum receiver.

FIG. 3 shows the preamble processor 316 for detecting the preamble and the pilot processor 317 for continuing to receive the packet after detecting the preamble. Upon detecting the preamble, the processor 319 initiates an ACK signal which passes to packet formatter 324 and is radiated by the BS spread-spectrum transmitter.

The first RS-spread-spectrum receiver receives the acknowledgment signal. Upon receiving the ACK signal, the first RS-spread-spectrum transmitter transmits to the BS-spread-spectrum receiver, a spread-spectrum signal having data. The data is shown in FIG. 6, in time, after the ACK signal. The data includes a collision detection (CD) portion of the signal, referred to herein as a collision detection signal, and message.

Figure 10:
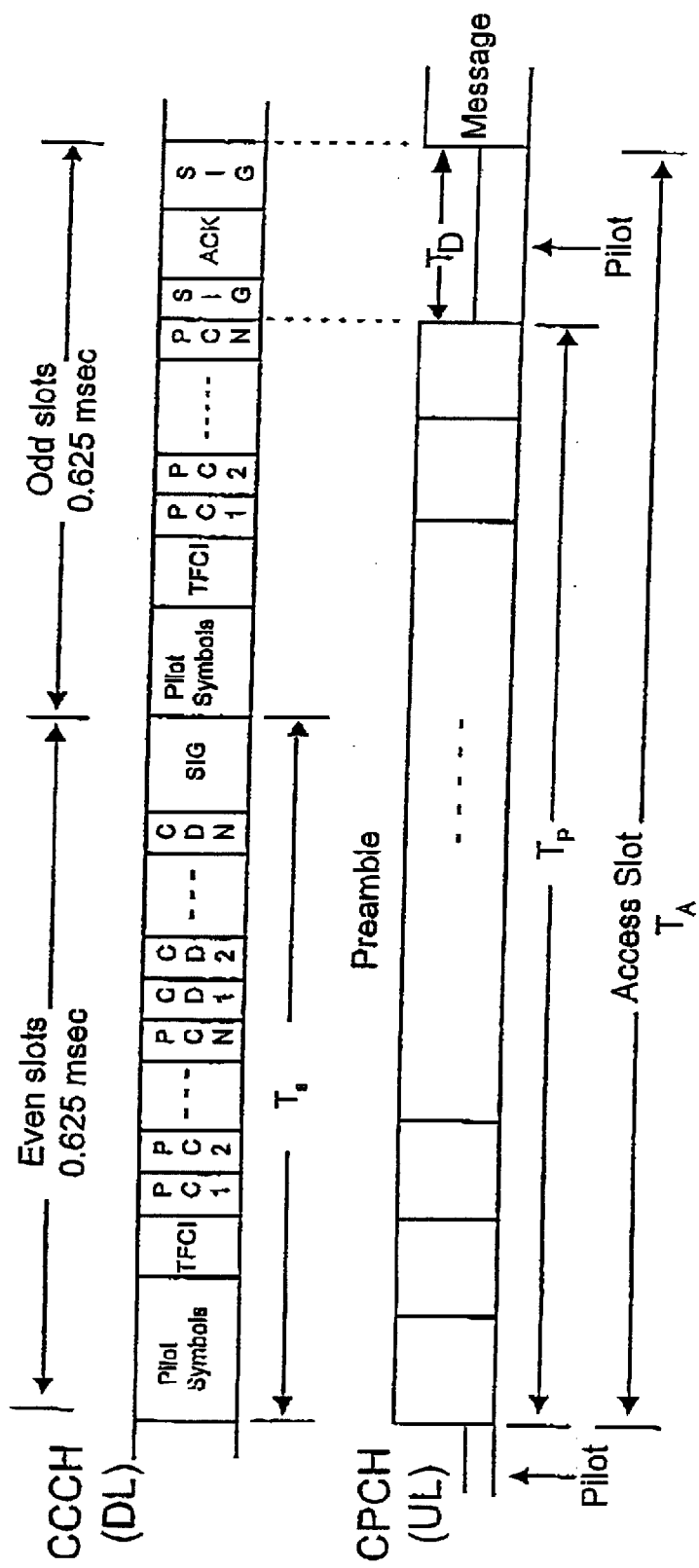
FIG. 10 is a common packet channel timing diagram and frame format of the down link common control link.
Figure 11:
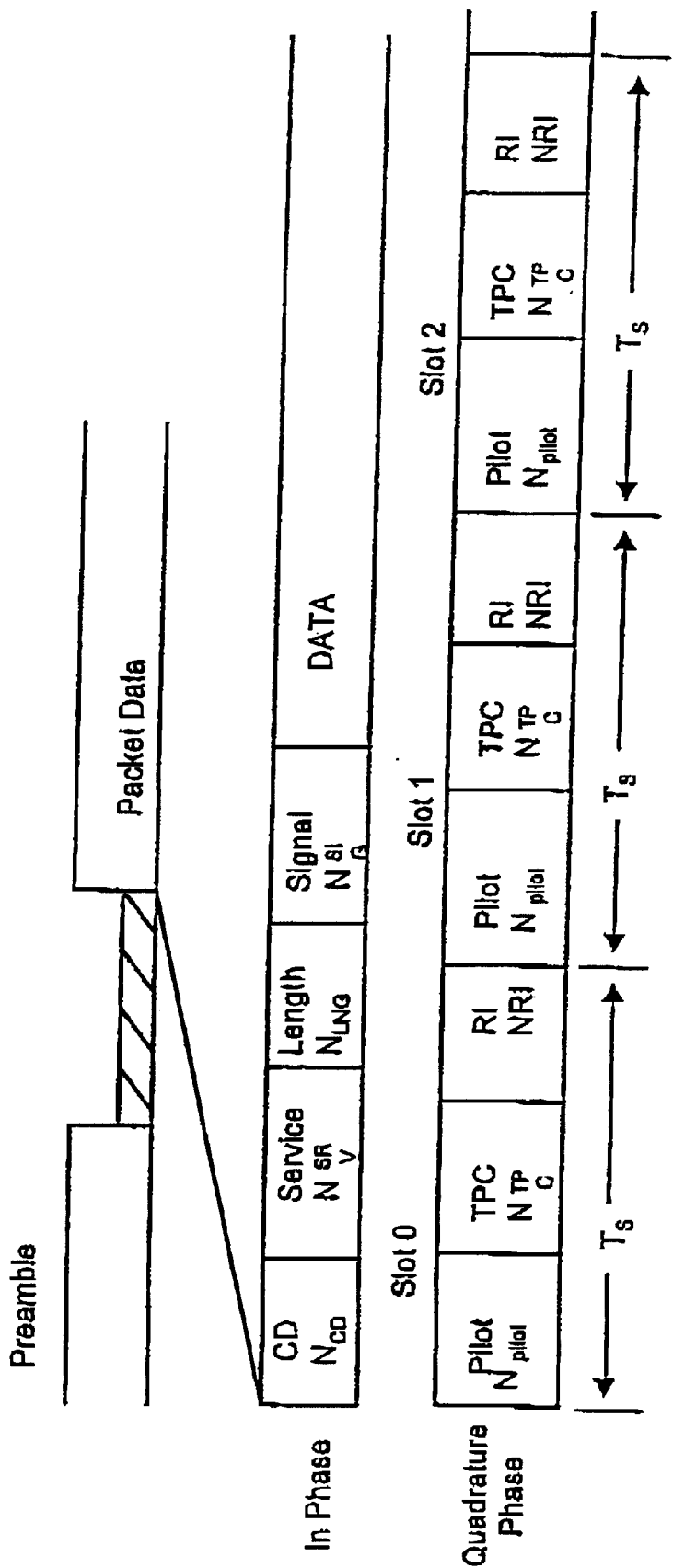
FIG. 11 illustrates frame format of common packet channel, packet data.

In response to each packet transmitted from the RS spread-spectrum transmitter, the BS receiver detects the collision detection portion of the data, and retransmits the data field of the collision detection portion of the data to the remote station. FIG. 10 shows the timing diagram for re-transmitting the collision detection field. There are several slots for collision detection retransmission, which can be used for re-transmitting the collision detection field for several remote stations. If the collision detection field were correctly re-transmitted to the remote station, then the remote station knows its packet is successfully received by the base station. If the collision detection field were not correctly re-transmitted by the base station, then the remote station assumes there is a collision with a packet transmitted by another remote station, and stops further transmission of the data. FIG. 11 shows a frame format of a common-packet channel data payload.

In operation, an overview of the way this transport mechanism is used is as follows. A remote station (RS) upon power up searches for transmission from nearby base stations. Upon successful synchronization with one or more base stations, the Remote station receives the necessary system parameters from a continuously transmitted by all base stations broadcast control channel (BCCH). Using the information transmitted from the BCCH, the remote station can determine various parameters required when first transmitting to a base station. Parameters of interest are the loading of all the base station in the vicinity of the remote station, their antenna characteristics, spreading codes used to spread the downlink transmitted information, timing information and other control information. With this information, the remote station can transmit specific waveforms in order to capture the attention of a nearby base station. In the common packet channel the remote station, having all the necessary information from the nearby base station, it starts transmitting a particular preamble from a set of predefined preambles, at a well selected time intervals. The particular structure of the preamble waveforms is selected on the basis that detection of the preamble waveform at the base station is to be as easy as possible with minimal loss in detectability.

The physical common packet channel (CPCH) is used to carry the CPCH. It is based on the well known Slotted ALOHA approach. There are a number of well defined time offsets relative to the frame boundary of a downlink received BCCH channel. These time offsets define access slots. The number of access slots is chosen according to the particular application at hand. As an example, shown in FIG. 5, eight access slots are spaced 1.25 msec apart in a frame of 10-msec duration.

According to FIG. 5, a remote station picks an access slot in a random fashion and tries to obtain a connection with a base station by transmitting a preamble waveform. The base station is able to recognize this preamble, and is expecting its reception at the beginning of each access slot. The length of the access burst is variable and the length of the access burst is allowed to vary from a few access slots to many frame durations. The amount of data transmitted by the remote station could depend on various factors. Some of those are: class capability of the remote station, prioritization, the control information transmitted down by the base station, and various bandwidth management protocols residing and executed at the base station. A field at the beginning of the data portion signifies the length of the data.

The structure of the access burst is shown in FIG. 6. The access burst starts with a set of preambles of duration Tp whose power is increased in time from preamble to preamble in a step-wise manner. The transmitted power during each preamble is constant. For the duration TD between preambles the access burst consists of a pilot signal transmitted at a fixed power level ratio relative to the previously transmitted preamble. There is a one to one correspondence between the code structure of the preamble and the pilot signal. The pilot signal could be eliminated by setting it to a zero power level.

The transmission of the preambles ceases because either the preamble has been picked up, detected, by the base station, and the base station has responded to the remote station with a layer one acknowledgment L1 ACK which the remote station has also successfully received. Transmission of the preamble ceases also if the remote station has transmitted the maximum allowed number of preambles MP. Upon receiving this L1 ACK the remote station starts transmission of its data. Once the remote station has transmitted more than MP preambles, it undergoes a forced random back off procedure. This procedure forces the remote station to delay its access burst transmission for a later time. The random back off procedure could be parameterized based on the priority statues of the Remote station. The amount by which the power is increased from preamble to preamble is DP which is either fixed for all cells at all times or it is repeatedly broadcast via the BCCH. Remote stations with different priorities status could use a power increase which depends on a priority status assigned to the remote station. The priority status could be either predetermined or assigned to the remote station after negotiation with the base station.

The Preamble Signal Structure

There is a large set of possible preamble waveforms. Every base station is assigned a subset of preambles from the set of all preamble waveforms in the system. The set of preambles a base station is using is broadcast through it's BCCH channel. There are many ways of generating preamble waveforms. One existing way is to use a single orthogonal Gold code per preamble from the set of all possible orthogonal Gold codes of length L. A preamble could then be constructed by repeating the Gold code a number of times N to transmit a length N complex sequence. For example if A denotes the orthogonal Gold code and $G_i = \{g_{i,0}\ g_{i,1}\ g_{i,2}\ \ldots\ g_{i,N-1}\}$, a length N complex sequence, then a preamble could be formed as shown in FIG. 8, where, $g_{i,j}$, j=0, ... ,N-1, multiplies every element in A. Normally the sets of $G_i$'s are chosen to be orthogonal to each other. This will allow for a maximum of N possible waveforms. The total number of possible preambles is then L*N.

The preferred approach is to use different codes rather than a single repeating code in generating each preamble. In that case, if L possible codes, not necessarily Gold Codes, were possible, designated by $A_0, A_1, \ldots A_{L-1}$, then possible preambles will be as shown in FIG. 8. The order of the $A_i$'s can be chosen so that identical codes are not used in the same locations for two different preambles. A similar approach could be used to form the pilot signals.

The Downlink Common Control Channel

In FIG. 10, the downlink common control channel structure for even and odd slots is shown. The even slots contain reference data and control data. The pilot symbols are used to derive a reference for demodulating the remaining control symbols. The control symbols are made of transport frame indicator (TFI) symbols, power control (PC) symbols, collision detection (CD) symbol and signaling symbols (SIG). The odd slots contain all the information that the even slots contain plus an acknowledgment (ACK) signal. Odd slots do not include collision detection fields.

The uplink CPCH is shown over the last transmitted preamble. After the last transmitted preamble, the base station has successfully detected the transmission of the last transmitted preamble and transmits back the acknowledgment signal. During the same time, the remote station is tuned to receive the ACK signal. The ACK signal transmitted corresponds to the specific preamble structure transmitted on the uplink. Once the remote station detects the ACK signal corresponding to transmitted preamble by the remote station, the remote station begins transmission of its data.

Corresponding with the preamble structure in the uplink there is a corresponding in time power control information symbol and a corresponding in time collision detection field. Upon start of data transmission the remote station uses the downlink transmitted power control information to adjust its transmitted power. The power control symbols are decoded to derive a binary decision data, which is then used to increase or decrease the transmitted power accordingly. FIG. 11 shows the structure of the uplink frame and the slot format for the data portion of the uplink transmission. Data and control information is transmitted in an in-phase and quadrature-phase multiplexed format. That is, the data portion could be transmitted on the in-phase coordinate and the control portion on the quadrature-phase coordinate. The modulation for the data and control is BPSK. The control channel contains the information for the receiver to enable the demodulation of the data. The control channel provides for upper layer system functionality. The data portion consists of one or more frames. Each frame consists of a number of slots. As an example the frame duration could be 10 milliseconds long and the slot duration 0.625 milliseconds long. In that case, there are 16 slots per frame. The beginning of the data payload contains a collision detection field used to relay information about the possibility of collision with other simultaneously transmitting remote stations. The collision detection field is read by the base station. The base station expects the presence of the collision detection field since it had provided an ACK signal at the last time slot.

The collision detection field includes a temporary identification (ID) number chosen at random by the mobile for the transmission of the current packet. The base station reads the collision detection field and reflects, or transmits back, the collision detection field on the downlink. If the collision detection field detected by the remote station matched the one just being transmitted by the same remote station, then the collision detection field is an identification that the transmission is being received correctly. The remote station then continues transmitting the remaining of the packet. In case the collision detection field has not been received correctly by the remote station, then the remote station considers the packet reception by the base station as erroneous and discontinues transmission of the remaining packet.

The function of the remaining fields are as follows. The Pilot field enables the demodulation of both the data and control bits. The transmitted power control (TPC) bits are used to control the power of a corresponding downlink channel, in case a down link channel directed to the same user is operational. If the downlink channel were not operational, then the TPC control bits can be used to relay additional pilot bits instead.

The Rate Information (RI) field is used to provide the transmitter with the ability to change its data rate without the necessity to explicitly negotiate the instantaneous data rate with the base station. The service field provides information of the particular service the data bits are to be used for. The length field specifies the time duration of the packet. The signal field can be used to provide additional control information as required.

Additional functionalities of the common packet channel are: (1) bandwidth management and (2) L2 acknowledgment mechanism.

The bandwidth management functionality is implemented via signaling information on the down link common control channel. There are three ways for incorporating this functionality. The first relies on changing the priority status of all uplink users, which currently are transmitting information using the CPCH. By this method all the users are remapping their priority status via a control signal sent at the downlink. When the priority of the CPCH users is lowered their ability to capture an uplink channel is lowered. Thus the amount of data sent on the uplink by the CPCH users is thus reduced. The other mechanism is for the base station to relay the maximum possible data rate the CPCH users are allowed to transmit. This prevents the CPCH users from transmitting at a rate which could possibly exceed the uplink system capacity and therefore take the cell down, i.e., disrupt the communication for all users currently connected to the base station. For the third method, the base station could provide a negative acknowledgment through the ACK signal. In this case, any remote station which is tuned to receive the ACK signal is prohibited from further transmission of an access-burst signal.

The L2 acknowledgment (L2 ACK) mechanism, which is different than the L1 ACK, is used by the base station to notify the remote station for the correctness of an uplink packet reception. The base station could either relay to the remote station which portions of the packet have being received correctly or which have being received incorrectly. There are many existing ways of implementing a particular protocol to relay this type of information. For example, the packet could be identified as consisting of a number of frames, with each frame consisting of a number of sub-frames. The frames are identified by a predetermined number. The sub-frames in each frame are also identified by a specific number. One way for the base to relay the information about the correctness of the packet is to identify all the frames and sub-frames that have been received correctly. Another way is to identify the frames and sub-frames that have been received in error. The way the base station could identify the correctness of a frame or sub-frame is by checking its cyclic residue code (CRC) field. Other more robust mechanisms for acknowledgment may be used. For example, a negative acknowledgment may be part of the common packet channel. The base station could send a negative acknowledgment (ACK), as part of the LI ACK, in order to force the remote station from transmitting the message part.

CD Operation

There are many remote stations that might try to access the base station at the same time. There is a number of different preamble signals which a remote station can use for reaching the base station. Each remote station chooses at random one of the preamble signals to use for accessing the base station. The base station transmits a broadcast common synchronization channel. This broadcast common synchronization channel includes a frame timing signal. The remote stations extract the frame timing transmitted by the base station by receiving the broadcast common synchronization channel. The frame timing is used by the remote stations to derive a timing schedule by dividing the frame duration in a number of access slots. The remote stations are allowed to transmit their preambles only at the beginning of each access slot. The actual transmit times for different remote stations could be slightly different due to their different propagation delays. This defines an access protocol commonly known as the slotted ALOHA access protocol. Each remote station repeatedly transmits its preamble signal until the base station detects the preamble, acknowledges that the preamble is received, and the acknowledgment is correctly received by the remote station. There could be more than one remote station transmitting the same preamble signal in the same access slot. The base station cannot recognize if two or more remote stations were transmitting the same preamble in the same access slot. When the base station detects the transmission of a preamble signal, it transmits back an acknowledgment message.

There is one acknowledgment message corresponding to each possible preamble signal. Therefore, the are as many acknowledgment messages as there are preamble signals. Every transmitting remote station which receives an acknowledgment message corresponding to its transmitting preamble signal, will start transmitting its message. For each preamble signal, there is a corresponding spreading code used by the base station to transmit the message. The message transmission always starts at the beginning of an access slot. Since there could be a number of remote stations using the same preamble signal in the same access slot, they start transmitting their message at the same time using the same spreading code. In that case, the transmissions of the remote stations likely interferes with each other and thus is not received correctly.

Each remote station includes a collision detection (CD) field in the beginning of the transmitted message. The CD field is chosen at random by each remote station and independently from each other Remote Station. There is a predefined limited number of CD fields. Two remote stations transmitting their message at the same time most likely chose a different CD field. When the base station receives the CD field, the base station reflects back, transmits back, the CD field to the remote station. The remote station reads the reflected CD field by the base station. If the reflected CD field matched the CD field the remote station transmitted, the remote station assumes that the remote station is being received correctly by the base station and continue transmitting the rest of the message, or data. If the reflected CD field from the base station did not match the one transmitted by the remote station, then the remote station assumes that there has been a collision and stops transmitting the remaining message or data.

Pre-Data Power Control

Figure 12:
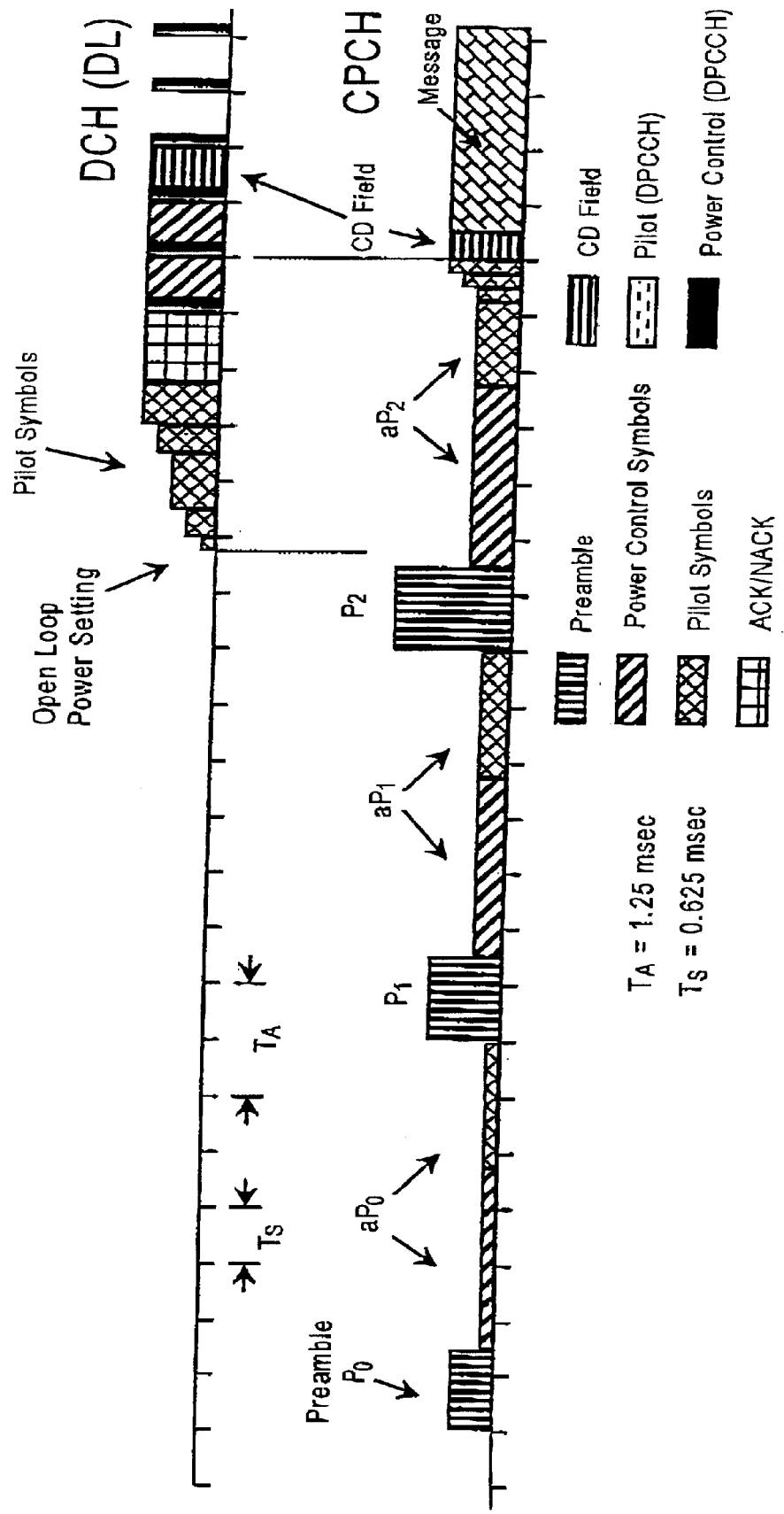
FIG. 12 illustrates a common-packet channel timing diagram for mutual pre-data transmission power control.

FIG. 12 shows an alternative embodiment for the RS-access-burst signal transmitted from the remote station to the base station. The base station transmits a frame-timing signal using the broadcast common-synchronization channel. The remote station synchronizes to the broadcast common-synchronization channel and retrieves frame-timing information from the frame-timing signal. The frame-timing information includes the timing for when the remote station can transmit an access-burst signal. Using the frame-timing information, the remote station sets up a transmission timing schedule. For this embodiment, the remote station divides the frame time duration into a number of access-time slots. The duration of a time slot can be half the duration of an access slot. The remote station starts transmitting an access-burst signal at the beginning of an access-time slot. The frame-time reference of the remote station is not necessarily the same as the frame-time reference of the base station, due to propagation delays.

The access-burst signal of FIG. 12 comprises a plurality of RS-preamble signals, RS-power-control signals, and RS-pilot signals, respectively, transmitted in time, at increasing power levels. The power from RS-preamble signal to RS-preamble signal increases according to the power values $P_0, P_1, P_2, \ldots$. The power values increase according to their index, that is, $P_0<P_1<P_2, \ldots$. The combined plurality of RS-preamble signals, RS-power-control signals, and RS-pilot signals, makeup part of, or all of, the access-burst signal. The power level of the RS-power-control signal and the RS-pilot signal may be at a proportion of the power level of the RS-preamble signal.

The plurality of RS-preamble signals, RS-power-control signals, and RS-pilot signals is followed in time by a data. Thus, the access-burst signal also may include a data part. Alternatively, the access-burst signal may include the plurality of RS-preamble signals, RS-power-control signals, and RS-pilot signals, and the data are considered concatenated to the access-burst signal. The data may include message information, or other information such as signaling, etc. The data preferably are concatenated to, or are part of, the access-burst signal, but may be sent separately from the access-burst signal.

As shown in FIG. 12, an RS-power-control signal, which is a time portion of the access-burst signal, is transmitted first in time during the time interval between RS preamble signal to RS preamble signal. The RS-preamble signal is a time portion of the access-burst signal, as shown in FIG. 12. An RS-pilot signal is transmitted second in time during the time interval between RS-preamble signal to RS-preamble signal.

The RS-power-control signal is for power control of a dedicated downlink channel. The base station transmits the dedicated downlink in response to detecting the RS-preamble signal transmitted by the remote station. The RS-pilot signal allows the base station to measure the received power from the remote station, and consequently power control the remote station using power control information transmitted from the base station to the remote station.

Within an access-burst signal, the remote station continuously transmits an RS-preamble signal, followed by a RS-power-control signal, and followed by a RS-pilot signal. The base station receiver searches for the transmission of the RS-preamble signals. At a predetermined time instant after the base station detects an RS-preamble signal, the base station starts transmitting a BS-preamble signal as shown in FIG. 12. The remote station, after every transmission of a RS-preamble signal, tunes its receiver to receive the BS-preamble-pilot signal. The RS-pilot signal transmission timing offset is previously known to the remote station. The remote station starts receiving the BS-preamble-pilot signal at the known time instant. The spreading code used by the base station to transmit the BS-preamble-pilot signal is known to the remote station since the BS-preamble-pilot signal is tied to the type of RS-preamble signal which the remote station transmitted.

The remote station starts the reception process of the BS-preamble-pilot signal whether the BS-preamble-pilot signal is transmitted or is not transmitted. The remote station does not make an effort to determine if the BS-preamble-pilot signal were transmitted or not. The reception of the BS-preamble-pilot signal enables the remote station to measure the signal quality of the transmitted BS-preamble-pilot signal. This quality measure could be, for example, the received signal-to-noise-ratio (SNR), or probability of error, due to the reception of the BS-preamble-pilot signal by the remote station.

The initial power level of the BS-preamble-pilot signal is determined by the base station prior to transmission. As a result of the BS-preamble-pilot signal reception, the remote station determines if the SNR of the received BS-preamble-pilot signal were above or below a previously defined SNR level of the remote station (RS-SNR-level). If the BS-preamble-pilot signal were not transmitted by the base station, then the remote station demodulator, or processor, likely decides that the transmitted BS-preamble-pilot signal is received at an SNR well below the previously defined RS-SNR-level.

While measuring the received SNR of the BS-preamble-pilot signal, the remote station transmits power control commands using the RS-power-control signal. If the SNR of the received BS-preamble-pilot signal, measured by the remote station, fell below the previously defined RS-SNR-level, then the remote station sends a "increase" signal, e.g., a 1-bit, to the base station, commanding the base station to increase the transmitting power level of the BS-preamble-pilot signal. In the case the SNR of the BS-preamble-pilot signal, measured by the remote station, fell above the previously defined RS-SNR-level, the remote station sends a "reduce" signal, e.g., a 0-bit, to the base station commanding the base station to reduce the transmission power level of the BS-preamble-pilot signal. This process continues for the time duration of the RS-power-control signal. If the base station had detected the RS-preamble signal, then the power of transmitted BS-preamble-pilot signal is adjusted by the remote station to bring the measured SNR of the received BS-preamble-pilot close to the predefined RS-SNR-level.

After a predetermined time interval from detecting of the RS-preamble signal, the base station transmit an acknowledgment message. The time of transmission as well as the code structure of the acknowledgment message is known to the remote station. The structure of the acknowledgment message is tied to the code structure of the RS-preamble transmitted by the remote station. The remote station sets its receiver to detect the acknowledgment message. At the same time, the remote station starts transmitting the RS-pilot signal, which the base station is able to receive since the base station knows the transmission time as well as code structure of the RS-pilot signal. If the remote station did not detect an acknowledgment transmitted by the base station, then the remote station assumes that the remote station's previously transmitted RS-preamble signal is not detected by the base station. In such a case, the remote station will set up for transmitting the next RS-preamble signal transmission. If the remote station detected the transmission of the acknowledgment message, then the remote station decodes the message.

From the decoded message, the remote station decides if the decoded acknowledgment message is a positive or negative acknowledgment. If the acknowledgment message were determined to be negative, then the remote station stops all transmissions. The remote station starts again at a later time by going to a predetermined back-off process. If the acknowledgment message were determined to be positive, then the remote station continues transmitting the RS-pilot signal.

The base station receives the RS-pilot signal and determines if the received SNR of the received RS-pilot signal were above or below a predetermined BS-SNR-level. If the measured received SNR of the RS-pilot signal were below the predetermined BS-SNR-level, then the base station commands the remote station to increase the transmitting power of the remote station, by sending an "increase" signal, such as a 1-bit command, to the remote station. If the measured received SNR of the RS-pilot signal were above the predetermined BS-SNR-level, then the base station commands the remote station to decrease its transmitting power by sending a "reduce" signal, such as a 0-bit command, to the remote station. These commands could be transmitted via a set of DPCCH-pilot symbols followed by a few power-control symbols.

During the first two time slots, additional power control commands are transmitted between consecutive DPCCH-power-control symbols and DPCCH-pilot symbols as shown in FIG. 12. The transmission of these power control commands brings the power level of the transmitted RS-pilot signal close to the predefined BS-SNR-level. As a precaution, the total amount of power change for both the remote station and the base station might be limited to a predetermined maximum value. This value could be fixed, or broadcast by the base station. Since the remote station received a positive acknowledgment from the base station and the remote station completed the transmission of the RS-pilot signal, the remote station transmits a RS-collision-detection field followed by a message carrying data information. The RS-collision-detection field is received by the base station and transmitted back to the remote station at the following transmitted time slot as a BS-collision-detection field. If the BS-collision-detection field, received by the remote station, matched the RS-collision detection field transmitted by the remote station, then the remote station continues transmitting the remaining message.

The base station continues to power control the remote station by continuously transmitting DPDCH-pilot signals and DPDCH-power control signals. If the BS-collision-detection field did not match the transmitted RS-collision-detection field, then the remote station decides that its transmission collided with the transmission by another remote station trying to access the base station at the same time using the same RS-access-burst signal code structure and stop any transmission until a later time.

It will be apparent to those skilled in the art that various modifications can be made to the common packet channel of the instant invention without departing from the scope or spirit of the invention, and it is intended that the present invention cover modifications and variations of the common packet channel provided they come within the scope of the appended claims and their equivalents.

We claim:

1. A method of providing a packet communication service in a code-division multiple-access (CDMA) wireless network, comprising:

broadcasting a frame-timing signal from a CDMA base station of the network, over a common synchronization channel modulated with a common chip-sequence signal;

selectively authorizing remote CDMA stations to use a Common Packet Channel for packet transmissions to the CDMA base station, on a slotted-ALOHA basis, in a predetermined relationship to the frame-timing signal;

receiving RS power control signals over the Common Packet Channel from each respective one of the authorized remote CDMA stations, at the CDMA base station;

transmitting BS power control signals to the respective authorized remote CDMA stations, from the CDMA base station, at power levels based on the received RS power control signals;

receiving BS power control signals from the CDMA base station at each respective one of the authorized remote CDMA stations;

transmitting RS power control signals over the Common Packet Channel to the CDMA base station, from the respective authorized remote CDMA stations at power levels based on received BS power control signals;

transmitting packet data and control signals from the respective authorized remote CDMA stations over the Common Packet Channel to the CDMA base station based on received BS power control signals; and transmitting control signals over a downlink channel intended for respective authorized remote CDMA stations at power levels based on received RS power control signals.

2. A method as in claim 1, wherein the step of transmitting signals over a downlink channel comprises transmitting data and power control signals intended for each respective authorized remote CDMA station over the downlink channel.

3. A method as in claim 1, wherein the step of selectively authorizing comprises:
receiving preamble codes from respective remote CDMA stations; and
in response, transmitting back acknowledgement signals, each acknowledgment signal comprising a code corresponding to a respective one of the preamble codes.

4. A method as in claim 3, wherein the step of receiving RS power control signals at the CDMA base station occurs after the reception of a respective preamble code from the one authorized remote CDMA station.

5. A method as in claim 3, wherein the step of receiving BS power control signals at each respective one of the remote CDMA stations occurs after the reception of an acknowledgement signal from the CDMA base station.

6. A method as in claim 1, wherein reception of packet data from a specific one authorized remote CDMA station comprises:
receiving over the common packet channel a selected collision detection code from the specific remote CDMA station;
in response to receipt of the selected collision detection code, transmitting back a corresponding collision detection code; and
subsequently receiving data and control signals over the common packet channel from the specific remote CDMA station.

7. A code-division-multiple-access (CDMA) wireless base station, the base station being assigned a set of possible coded preamble signals for use in CDMA communications the CDMA base station comprising:
a CDMA transmitter;
a CDMA receiver; and
a controller coupled to the CDMA receiver for responding to received signals and coupled for control of the CDMA transmitter, such that in operation the CDMA base station:
receives over a Common Packet Channel from a remote station a detectable access burst comprising one of the possible coded preamble signals assigned to the base station selected by the remote station;
sends a coded acknowledgement signal over a control channel, the coded acknowledgement signal corresponding to the received coded preamble signal;
receives power control signals over the common packet channel from the remote station;
sends power control signals over the control channel to the remote station based on the received power control signals;
receives power control signals and data, over the Common Packet Channel, from the remote station; and
transmits signals intended for the remote station at power levels based on the received power control signals.

8. A CDMA base station as in claim 7, wherein:
the reception of data over the Common Packet Channel from the remote station comprises receiving a coded collision detection signal;

upon receipt of the coded collision detection signal, the controller causes the CDMA base station to transmit back over the control channel a corresponding coded collision detection signal; and
the reception of data over the Common Packet Channel from the remote station further comprises receiving the data after transmission of the corresponding coded collision detection signal.

9. A CDMA base station as in claim 7, wherein the controller causes the CDMA transmitter to broadcast a frame-timing signal over a common synchronization channel modulated with a common chip-sequence signal.

10. A CDMA base station as in claim 9, wherein the CDMA receiver receives the access burst in one of a plurality of access slots defined in relation to the frame-timing signal.

11. A CDMA base station as in claim 7, wherein:
the reception of a detectable access burst comprises receiving one or more coded preamble signals that may be transmitted at sequentially increasing discrete power levels;
the controller causes the CDMA transmitter to transmit the acknowledgement signal in response to a first coded preamble signal that is received at an adequate power level;
the reception of power control signals follows the reception of the detectable access burst.

12. A code-division-multiple-access (CDMA) wireless mobile station, comprising:
a CDMA transmitter;
a CDMA receiver; and
a controller coupled to the CDMA receiver for responding to received signals and coupled for controlling the CDMA transmitter, such that in operation the wireless mobile station:
receives a frame-timing signal from a CDMA base station over a broadcast common synchronization channel having a common chip-sequence signal;
determines frame timing from the received frame-timing signal;
transmits an access burst signal over a Common Packet Channel, in a time slot selected from a plurality of time slots having predefined relationships to the determined frame timing;
receives an acknowledgement signal corresponding to the access burst signal, from the CDMA base station;
receives power control signals and data from the CDMA base station; and
transmits power control signals and packet data to the CDMA base station over the Common Packet Channel at power levels based on the received power control signals,
wherein at least the transmission of the packet data is responsive to receipt of the acknowledgement signal.

13. A CDMA wireless mobile station as in claim 12, wherein the controller causes the CDMA transmitter to transmit the power control signals to the CDMA base station, prior to the transmission of the packet data.

14. A CDMA wireless mobile station as in claim 13, wherein the controller causes the CDMA transmitter to transmit power control signals after a coded preamble signal within the access burst signal.

15. A CDMA wireless mobile station as in claim 12, wherein the controller causes the CDMA transmitter to transmit a selected collision detection code following receipt of the acknowledgement signal and initiates transmission of at least the packet data in response to receipt of a collision detection code from the CDMA base station that corresponds to the selected collision detection code.

16. A method of transferring data for one of a plurality of wireless remote station (RS) handsets through a base station (BS) of a wireless telecommunication network, the base station comprising a BS-spread-spectrum transmitter and a BS-spread-spectrum receiver, the method comprising the steps of:

transmitting a frame-timing signal from said BS-spread-spectrum transmitter over a broadcast common-synchronization channel having a common chip-sequence signal;

receiving the broadcast common-synchronization channel comprising a frame timing signal at an RS-spread-spectrum receiver of the one RS handset;

determining frame timing at an RS-spread-spectrum receiver of the one RS handset from the received frame-timing signal;

transmitting one or more segments of an access-burst signal from an RS-spread-spectrum transmitter of the one RS handset, wherein timing of the one or more segments is based on the determined frame timing;

transmitting a spread-spectrum signal comprising power control information and packet data from said RS-spread-spectrum transmitter;

receiving the spread-spectrum signal comprising power control information and packet data at said BS-spread-spectrum receiver;

receiving at least one segment of the access-burst signal at said BS spread-spectrum receiver;

transmitting an acknowledgment from said BS-spread-spectrum transmitter, in response to the receipt of the at least one segment of the access-burst signal;

receiving the acknowledgment at said RS-spread-spectrum receiver;

transmitting a spread-spectrum signal comprising power control information from said BS-spread-spectrum transmitter, after transmitting the acknowledgment;

receiving the spread-spectrum signal comprising power control information at said RS-spread-spectrum receiver;

transmitting from said BS-spread-spectrum transmitter, signals comprising power control information, to said RS-spread-spectrum receiver at power levels determined in part in response to received power control information;

transmitting data from said RS-spread-spectrum transmitter, to said BS-spread-spectrum receiver at power levels determined in part in response to the received power control information; and forwarding the received data from said base station to another network element.

17. The method as set forth in claim 16, wherein at least the transmission of the packet data from said RS-spread-spectrum transmitter is responsive to the reception of the acknowledgement at said RS-spread-spectrum receiver.

18. The method as set forth in claim 17, wherein the transmission of the power control signals from the RS-spread-spectrum transmitter follows the transmission of a segment of the access burst signal.

19. The method as set forth in claim 16, wherein:

the step of transmitting the access-burst signal comprises transmitting a plurality of segments at a plurality of respective power levels; and the step of receiving at least one segment comprises receiving at least one segment at a detectable power level.

20. The method as set forth in claim 19, wherein the step of transmitting the access-burst signal comprises transmitting the segments at sequentially increasing power levels.

21. The method as set forth in claim 16, wherein each segment comprises a selected one of a plurality of preamble codes, and the acknowledgement comprises a coded signal corresponding to the selected preamble code.

22. The method as set forth in claim 16, further comprising:

transmitting a selected one of a plurality of collision-detection (CD) codes by said RS-spread-spectrum transmitter, in response to receipt of the acknowledgment;

if the BS-spread-spectrum receiver detects the selected CD code from the RS-spread-spectrum transmitter, transmitting a corresponding BS-CD code from said BS-spread-spectrum transmitter; and if the RS-spread-spectrum receiver detects the corresponding BS-CD code, transmitting at least data to said base station, from said RS-spread-spectrum transmitter.

23. A method of providing a packet communication service in a code-division-multiple-access (CDMA) wireless network, comprising:

broadcasting a frame-timing signal from a CDMA base station of the network, over a common synchronization channel modulated with a common chip-sequence signal;

selectively authorizing one of a plurality of remote CDMA stations to use a Common Packet Channel for packet transmissions to the CDMA base station, on a slotted-aloha basis, in a predetermined relationship to the frame-timing signal;

receiving power control signals over the Common Packet Channel from the one authorized remote CDMA station, at the CDMA base station;

transmitting power control signals intended for the one authorized remote CDMA station, from the CDMA base station, at a power level based on the received power control signals; and receiving packet data from the one authorized remote CDMA station over the Common Packet Channel at the CDMA base station.

24. A method as in claim 23, further comprising transmitting additional signals intended for the one authorized remote CDMA station at power levels based on the received power control signals.

25. A method of providing a packet communication service in a code-division-multiple-access (CDMA) wireless network, comprising:

broadcasting a frame-timing signal from a CDMA base station of the network, over a common synchronization channel modulated with a common chip-sequence signal;

selectively authorizing remote CDMA stations to use a Common Packet Channel for packet transmissions to the CDMA base station, on a slotted-aloha basis, in a predetermined relationship to the frame-timing signal;

receiving power control signals over the Common Packet Channel from respective ones of the authorized remote CDMA stations, at the CDMA base station;

transmitting power control signals intended for the respective remote CDMA stations, from the CDMA base station, at power levels based on power control signals received from the respective remote CDMA stations; and receiving packet data from the respective remote CDMA stations over the Common Packet Channel at the CDMA base station.

26. A method as in claim 25, further comprising transmitting additional signals intended for the respective remote CDMA stations at power levels based on the power control signals received from the respective remote CDMA stations.

* * * * *